(12) United States Patent
Cohrs et al.

(10) Patent No.: US 12,311,411 B2
(45) Date of Patent: May 27, 2025

(54) CLEANING DEVICE, COMPRESSED AIR SYSTEM AND CLEANING METHOD FOR SUPPLYING A MEDIUM PULSE TO A SURFACE AND CORRESPONDING CONTROL SYSTEM AND VEHICLE

(71) Applicant: ZF CV Systems Hannover GmbH, Hannover (DE)

(72) Inventors: Jan Cohrs, Hannover (DE); Jan Fiebrandt, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 678 days.

(21) Appl. No.: 17/606,472

(22) PCT Filed: Apr. 28, 2020

(86) PCT No.: PCT/EP2020/061715
§ 371 (c)(1),
(2) Date: Oct. 26, 2021

(87) PCT Pub. No.: WO2020/225023
PCT Pub. Date: Nov. 12, 2020

(65) Prior Publication Data
US 2022/0193734 A1 Jun. 23, 2022

(30) Foreign Application Priority Data
May 3, 2019 (DE) .................. 10 2019 111 468.3

(51) Int. Cl.
*B08B 3/02* (2006.01)
*B08B 5/02* (2006.01)
(Continued)

(52) U.S. Cl.
CPC .................. *B08B 3/02* (2013.01); *B08B 5/02* (2013.01); *B60S 1/481* (2013.01); *B60S 1/52* (2013.01); *B60S 1/54* (2013.01); *B60S 1/56* (2013.01)

(58) Field of Classification Search
None
See application file for complete search history.

(56) References Cited

U.S. PATENT DOCUMENTS

| | | | |
|---|---|---|---|
| 5,657,929 A * | 8/1997 | DeWitt ..................... | B60S 1/52 239/284.2 |
| 2013/0152979 A1 | 6/2013 | Mueller et al. | |

(Continued)

FOREIGN PATENT DOCUMENTS

| | | |
|---|---|---|
| DE | 3803491 A1 | 8/1989 |
| DE | 102011056647 A1 | 6/2013 |

(Continued)

*Primary Examiner* — Omair Chaudhri
(74) *Attorney, Agent, or Firm* — LEYDIG, VOIT & MAYER, LTD.

(57) ABSTRACT

A cleaning device for supplying a medium pulse to a surface includes a pressure cylinder having a pressure connection, a medium connection, and a first nozzle connection. The volume of the pressure cylinder is divided into a first medium chamber and a second medium chamber and volumes thereof are configured to be changed. A switching valve is configured to switch between a first switching state and a second switching state. In the first switching state, the first medium chamber is connected to the first medium source to reduce the volume of the second medium chamber, and in the second switching state, the first medium chamber is connected to the second nozzle connection to increase the volume of the second medium chamber such that the surface can be supplied with the medium pulse.

24 Claims, 9 Drawing Sheets

(51) Int. Cl.
  *B60S 1/48*   (2006.01)
  *B60S 1/52*   (2006.01)
  *B60S 1/54*   (2006.01)
  *B60S 1/56*   (2006.01)

(56) References Cited

U.S. PATENT DOCUMENTS

| | | | |
|---|---|---|---|
| 2014/0217194 A1* | 8/2014 | Han | B60S 1/56 |
| | | | 239/284.1 |
| 2017/0168291 A1* | 6/2017 | Buss | G02B 27/0006 |
| 2017/0182980 A1* | 6/2017 | Davies | B05B 9/04 |
| 2018/0272999 A1 | 9/2018 | Giraud et al. | |
| 2018/0290631 A1* | 10/2018 | Rice | B60S 1/56 |
| 2018/0370498 A1* | 12/2018 | Combeau | F04B 39/0005 |
| 2019/0061698 A1* | 2/2019 | Mizuno | B60S 1/0848 |
| 2020/0001832 A1* | 1/2020 | Deane | B08B 3/02 |
| 2020/0215972 A1* | 7/2020 | Herman | B60R 11/04 |
| 2021/0001678 A1* | 1/2021 | Koyama | B60S 1/54 |
| 2022/0105902 A1* | 4/2022 | Adachi | B05B 1/3006 |

FOREIGN PATENT DOCUMENTS

| | | | |
|---|---|---|---|
| DE | 102015121434 A1 | | 6/2017 |
| EP | 2955069 A1 | | 12/2015 |
| EP | 3168094 A1 | | 5/2017 |
| KR | 20170137359 A | * | 12/2017 |

\* cited by examiner

CLEANING DEVICE, COMPRESSED AIR SYSTEM AND CLEANING METHOD FOR SUPPLYING A MEDIUM PULSE TO A SURFACE AND CORRESPONDING CONTROL SYSTEM AND VEHICLE

CROSS REFERENCE TO RELATED APPLICATIONS

This application is a U.S. National Phase application under 35 U.S.C. § 371 of International Application No. PCT/EP2020/061715, filed on Apr. 28, 2020, and claims benefit to German Patent Application No. DE 10 2019 111 468.3, filed on May 3, 2019. The International Application was published in German on Nov. 12, 2020 as WO 2020/225023 A1 under PCT Article 21(2).

FIELD

The disclosure relates to a cleaning device, to a compressed air system having a cleaning device, and to a corresponding cleaning method using the cleaning device or the compressed air system. The disclosure further relates to a vehicle having the cleaning device or compressed air system.

BACKGROUND

Cleaning devices, in particular for cleaning a sensor, preferably a number of one or more sensors in a vehicle, are widely known, e.g. in the form of a piston injector for sensor cleaning.

More specifically, such a cleaning device serves to supply a medium pulse to a surface, in particular a surface of a sensor, preferably an optical sensor, in particular an environment detection sensor, and has: a pressure cylinder, having a pressure connection, a medium connection and a first nozzle connection, wherein a separating and displacing means having a first and/or second pressure transmitter surface is arranged in the pressure cylinder in order to divide the volume of the pressure cylinder into a first medium chamber and a second medium chamber and to change a volume of the first and second medium chambers.

Such a cleaning device mentioned at the outset for a sensor surface of a vehicle is described in EP 3 168 094 A1. In this case, provision is made for the sensor surface to be supplied with compressed air and, necessarily, also with liquid, wherein the compressed air is to be generated by means of a liquid-operated compression chamber. This means that it is envisaged in all cases that, on the one hand, liquid pressurized by a liquid pump is supplied directly to a nozzle for supplying the sensor surface and, on the other hand, that this liquid is used to drive a piston in the compression chamber. In addition, compressed air is generated on the side of the chamber opposite the piston, which in turn is fed to a separate nozzle for supplying compressed air to the sensor surface.

The concept is still in need of improvement, especially in respect of the dependence of the cleaning device on liquid-based cleaning and the resulting additional liquid pump and the associated increased outlay in terms of equipment and therefore in terms of maintenance. It is desirable to ensure reliable and thorough cleaning, in particular with relatively low outlay, especially in terms of equipment. Furthermore, a low consumption of energy and cleaning media is desirable, as is robust, in particular as low-maintenance as possible, construction.

SUMMARY

In an embodiment, the present disclosure provides a cleaning device for supplying a medium pulse to a surface. The cleaning device includes a pressure cylinder having a pressure connection, a medium connection, and a first nozzle connection. The cleaning device further includes a separator and displacer, having a first and/or second pressure transmitter surface, arranged in the pressure cylinder in order to divide a volume of the pressure cylinder into a first medium chamber and a second medium chamber and configured to change a volume of the first and second medium chambers. In addition, the cleaning device includes a switching valve having a first pressure cylinder connection, a first medium source connection, and a second nozzle connection, the switching valve being configured to switch into a first switching state and a second switching state. In the first switching state, the first medium chamber is configured to be connected, via the pressure connection, to the first medium source connection in order to reduce the volume of the second medium chamber, and in the second switching state, the first medium chamber is connected, via the pressure connection, to the second nozzle connection in order to increase the volume of the second medium chamber such that the surface can be supplied with the medium pulse, the medium pulse being a medium pulse of a liquid medium and/or a medium pulse of a gaseous medium.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
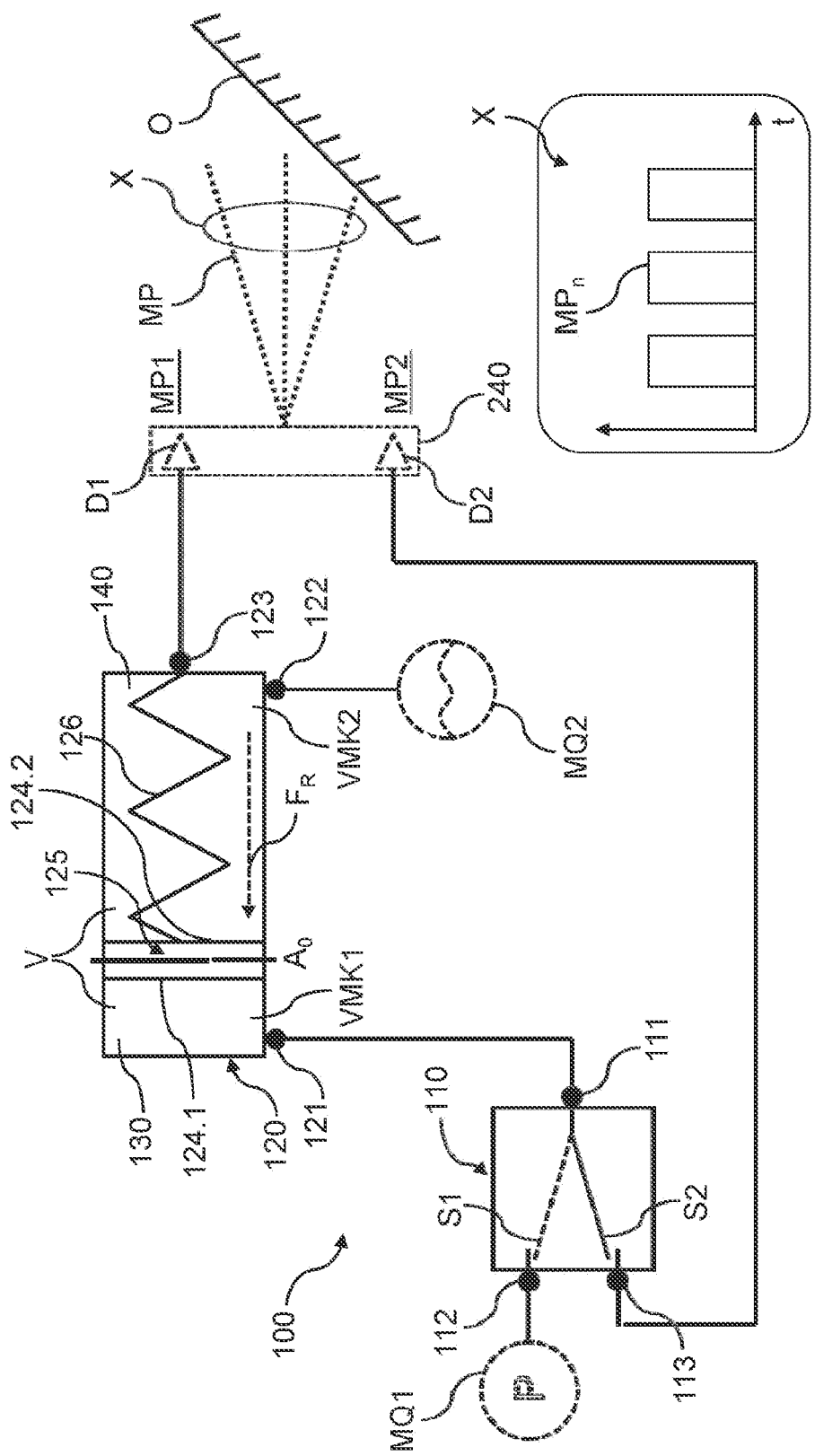
FIG. 1 shows the schematic view of a preferred embodiment of a cleaning device—showing in detail X a pulse sequence of medium pulses.

Aspects of the present disclosure provide a device and a method which at least partially eliminate the problems addressed above. In particular, a cleaning device and a compressed air system are disclosed with which reliable and thorough cleaning is ensured, in particular with a relatively low outlay, particularly in terms of equipment. In particular, a cleaning method is disclosed which achieves a high degree of reliability and thoroughness in cleaning, while nevertheless making it possible to reduce the outlay in terms of equipment and the outlay with regard to maintenance of a cleaning device. Consumption of energy and cleaning media is also to be achieved. Preferably, the consumption of water is to be limited or superfluous.

According to an aspect of the disclosure, a cleaning device includes a pressure cylinder, having a pressure connection, a medium connection and a first nozzle connection, wherein a separating and displacing means having a first and/or second pressure transmitter surface is arranged in the pressure cylinder in order to divide the volume of the pressure cylinder into a first medium chamber and a second medium chamber and to change a volume of the first and second medium chambers.

In the cleaning device of this kind a switching valve is provided, which has a first pressure cylinder connection, a first medium source connection and a second nozzle connection and is designed for switching into a first switching state and a second switching state, wherein furthermore, in the first switching state, the first medium chamber can be connected via the pressure connection to the first medium source connection in order to reduce the volume of the second medium chamber, and in the second switching state, the first medium chamber can be connected via the pressure connection to the second nozzle connection in order to increase the volume of the second medium chamber, in such a way that the surface can be supplied with a medium pulse of a liquid medium, and/or a medium pulse of a gaseous medium.

A pressure cylinder having a pressure connection, a medium connection and a first nozzle connection is generally advantageous for keeping expenditure in the cleaning of surfaces low. A separating and displacing means having a first and/or second pressure transmitter surface is arranged in the pressure cylinder in order to divide the pressure cylinder into a first medium chamber and a second medium chamber and to change the volume of the first and second medium chambers. This applies in particular to the cleaning of surfaces of a sensor or a sensor cover, for which a clean surface is a prerequisite for the proper and reliable functioning of the sensor.

For this purpose, in the first switching state, the first medium chamber can be connected via the pressure connection to the first medium source connection in order to reduce the volume of the second medium chamber, and in the second switching state, the first medium chamber can be connected via the pressure connection to the second nozzle connection in order to increase the volume of the second medium chamber.

An additional fluid pump for the liquid medium, in particular water, can be made superfluous.

In principle, the concept can also be implemented only with a gaseous medium, that the first and second switching states are designed in such a way that the surface can be supplied with a medium pulse of a liquid medium and/or a medium pulse of a gaseous medium.

In general, the cleaning effect of the pulse of a medium pulse is achieved, inter alia, by the mass of the medium. An impact speed of the medium on the surface and a relatively rapid triggering of the supply is advantageously increased. Rapid triggering of the supply leads—especially in contrast to a slowly and continuously increasing flow of the medium—to impingement, in particular, of a limited air mass stored in a reservoir on the surface in a relatively short period of time. The period of time can advantageously be set by means of comparatively fast "switching back and forth" between the first and second switching states. In this way, too, a high momentum for the medium pulse is advantageously achieved. As a result, a reduction in the outlay in terms of equipment and the expenditure of water is thus achieved in a particularly advantageous manner. This is accompanied by a reduction in the susceptibility to faults of the cleaning device, leading to reduced maintenance intervals and consequently to increased availability of the cleaning device.

According to an aspect of the disclosure, a compressed air system includes at least one cleaning device and at least one sensor of a sensor system, wherein the sensor, in particular a transparent cover of the sensor, has a surface. A first medium source of the compressed air system can be connected via a first medium feed line to the first medium source connection of the at least one cleaning device, and a second medium source can be connected via a second medium feed line to the medium connection of the at least one cleaning device, and at least one nozzle can be connected via a first nozzle feed line to the first nozzle connection and via a second nozzle feed line to the second nozzle connection of the at least one cleaning device.

In the compressed air system, the advantages resulting from the cleaning device are transferred to a compressed air system. In particular, the lower outlay in terms of equipment as a result of the elimination of the fluid pump which is otherwise additionally required and the lower dependence on mechanically moving parts is advantageous for applications in vehicles and the like machines, in particular mobile machines.

According to an aspect of the disclosure, a cleaning method provides for the use of at least one cleaning device and/or a compressed air system for supplying a medium pulse to a surface. A switching valve is provided, which has a first pressure cylinder connection, a first medium source connection and a second nozzle connection, and is switched into a first switching state and a second switching state. In the first switching state, the first medium chamber is connected via the pressure connection to the first medium source connection in order to reduce the volume of the second medium chamber, and in the second switching state, the first medium chamber is connected via the pressure connection to the second nozzle connection in order to increase the volume of the second medium chamber, in such a way that the surface is supplied with a medium pulse of a liquid medium, and/or a medium pulse of a gaseous medium.

The advantages of the cleaning device are likewise advantageously transferred, analogously to the compressed air system, to the method.

According to a further aspect of the disclosure, a vehicle has at least one cleaning device and/or a compressed air system and/or a control system having an open-loop and/or closed-loop control device, wherein the open-loop and/or closed-loop control device is designed to carry out steps of the cleaning method.

The advantages of the compressed air system and of the control system are advantageously transferred analogously to the vehicle. The advantages of the cleaning device are also advantageously transferred analogously to the control system. Moreover, when the compressed air system is used in a vehicle, the lower consumption of energy and cleaning media has an advantageous effect since energy and cleaning media are only available to a limited extent in vehicles and comparable mobile systems. Reliable cleaning is also important in a vehicle since sensors to be cleaned often take on critical and safety-relevant tasks.

As part of a particularly advantageous development, the separating and displacing means has a first and/or second pressure transmitter surface in the first medium chamber and/or the second medium chamber of the pressure cylinder, wherein the first and/or second pressure transmitter surface can be subjected to different pressures, in particular to produce a pressure difference in order to produce the medium pulse.

In particular, by virtue of an excess pressure in one of the chambers—here in the first chamber—a small compressed air accumulator is achieved which empties simply on account of the excess pressure (e.g. 3-5 bar) prevailing there and thus supplies the surface. The pulse force of the compressed air pulse (e.g. from the second or first medium chamber) results, in particular, from the expansion or pressure equalization via one of the nozzles.

Although pulse-type loading of the surface can advantageously take place additionally or first on the basis of a restoring force of the separating or displacing means of the pressure cylinder as such or of a return means, in the present scenario this is in addition to the effect which results from the fact that the first and/or second pressure transmitter surface can be subjected to different pressures.

The pulse force of the medium from the first medium chamber then results primarily from the application of pressure to the displacing means. Secondarily, this can also result correspondingly on the basis of a restoring force if this has been configured accordingly by virtue of the design. The first medium thus already has a pressure equalization potential with respect to the ambient pressure owing to the pressure difference at the first and second pressure transmitter surfaces, irrespective of further forces in the pressure cylinder. In addition, the restoring force of the return means can then also act in the course of the pressure equalization.

In particular, provision may—but need not—be made for the first medium chamber and/or the second medium chamber of the pressure cylinder additionally to have a return means. As a further development, provision is made for the pressure transmitter surface to be able to be acted upon by pressure on the side of the first medium chamber and/or to be able to be acted upon by a restoring force by way of the return means.

In particular, this can mean that the volume change of the first, and similarly, the second medium chamber is achieved by means of the pressure transmitter surface movable in the pressure cylinder, on the side of the first medium chamber by way of the pressure prevailing in the gaseous medium. As explained, the pressure transmitter surface is returned to an initial position by means of a pressure difference, in particular by means of a return means or by means of the restoring force exerted by the return means on the pressure transmitter surface, wherein the return means can be arranged in the second medium chamber, in the first medium chamber or in both medium chambers.

This results in the advantage that a minimum outlay in terms of equipment allows a large amount of latitude with regard to the technical design of the medium chamber. For example, the return means can be dispensed with or can be provided only in the first medium chamber or only in the second medium chamber or can be divided between the first medium chamber and the second medium chamber in order to optimize the usable volume of the second medium chamber or the service life of the return means.

Within the scope of a particularly preferred development, provision is made for the surface to be supplied with a medium pulse of the liquid medium, namely in the first switching state with a first medium pulse, preferably in the form of a water pulse or similar liquid pulse, and/or a medium pulse of the gaseous medium, namely in the second switching state with a second medium pulse, preferably in the form of a compressed air pulse.

According to this development, in the first switching state of the switching valve a pulse-type supply of the gaseous or the liquid medium to a surface from the second medium chamber can be achieved on the one hand by means of a pulse-type displacement of the pressure transmitter surface in the pressure cylinder—and thus by means of a pulse-type reduction in the volume of the second medium chamber. As a further development, in the second switching state of the switching valve, again by means of a pulse-type displacement of the pressure transmitter surface in the pressure cylinder, that is to say by resetting the pressure transmitter surface—and thus by means of a pulse-type increase in the volume of the second medium chamber—a further pulse-type supply of the gaseous medium to a surface from the first medium chamber is achieved on the other hand.

The term "pulse-type" can refer, in general, to a sudden, jerky supply of a medium to a surface, the momentum of which medium is suitable, in particular, for mechanically detaching and removing particles, in particular dirt particles, located on the surface.

In particular, provision is made for pulse-type emptying of the second medium chamber to be brought about via the first nozzle connection by means of the first medium chamber. In particular, pulse-type emptying of the first medium chamber can be brought about via the second nozzle connection via the restoring force, in particular against a pressure difference between the first pressurized chamber and ambient pressure in the sense of a pressure equalization as a result of expansion of the gaseous medium in the first medium chamber. In particular, a pulse intensity of the pulse-type emptying via the second nozzle connection of the first medium chamber in the sense of said expansion of the gaseous medium into the environment via the second nozzle connection is likewise dependent on the pressure of the gaseous medium prevailing there.

After pulse-type emptying of the first medium chamber via the second nozzle connection, provision is advantageously made for the filling of the first medium chamber with the gaseous medium to bring about pulse-type emptying of the second medium chamber. The restoring force then once again advantageously brings about a pulse-type emptying of the first medium chamber in the above sense. The medium, held in the first or second medium chamber, is in each case fed in via a first or a second nozzle connection. The embodiment advantageously reduces the mechanical complexity and, in addition, increases the reliability of the cleaning device.

As a further development, when the first medium chamber is emptied in a pulse-type manner, the second medium chamber of the pressure cylinder can be refilled at the same time with the liquid medium and the gaseous medium via the medium connection. In concrete terms, this can mean that the pulse-type emptying of the first medium chamber generates a vacuum in the second medium chamber, this resulting in induction of the gaseous medium and of the liquid medium at the medium connection of the second medium chamber. This results in the advantage that the refilling of the second medium chamber with either the gaseous medium or the liquid medium is accomplished without an additional pump or similar technical device. The outlay in terms of equipment is thus advantageously reduced and the reliability of the cleaning device is increased.

In particular, provision is made for the medium pulse emitted by the cleaning device to be a sequence of medium pulses, the composition and succession of which can be controlled in terms of time, in particular selectively and/or intermittently. This can be done specifically, in particular, by activating the switching valve. Depending on the degree of contamination, ambient conditions and operating parameters, optimum cleaning of the surface can advantageously be achieved by means of time-controlled application. Selective means, in particular, that only one medium is supplied to the surface at any one time. In concrete terms, this can mean, in particular, that the application of one, for example gaseous, medium is completely interrupted, and then the application of the other, for example liquid, medium is started and, conversely, the application of the gaseous medium is continued again only after the application of the liquid medium is interrupted. Defined pauses, in particular also within a medium sequence, can lie between the applications in order, for example, to soften dirt particles. Intermittent furthermore means, in particular, that the respective medium flows, in particular the flows of the gaseous medium and of the liquid medium, can in each case be triggered and interrupted.

It is advantageously provided that the volume of the pressure cylinder defines a volume flow of the gaseous and/or liquid medium which can be generated by the pressure cylinder. In concrete terms, this can mean that a volume flow that can be generated can be set in an advantageous manner by means of the design configuration of the pressure cylinder. This eliminates the need for complex volume flow control for each medium. Thus, the outlay in terms of equipment is significantly reduced, as is similarly the susceptibility of the cleaning device to faults. If, in addition, a higher or a lower volume flow becomes necessary during the operation of the system, this is advantageously possible by simply replacing the pressure cylinder. It is furthermore conceivable, for example, to make the first medium chamber larger than the second medium chamber or vice versa. It would thus be possible additionally to generate a different volume flow from the first or the second medium chamber. This results in the advantage that, for example, a lower volume flow of the liquid medium can be generated from the second medium chamber and thus demand-oriented, reduced consumption of the liquid medium can be achieved.

A pressure transmitter surface in the pressure cylinder, which divides the latter into a first medium chamber and a second medium chamber, is advantageously a component of the separating and displacing means.

As a further development, the pressure cylinder has the separating and displacing means to bring about pulse-type emptying of the second medium chamber via the first nozzle connection, wherein the pulse intensity of the pulse-type emptying of the second medium chamber via the first nozzle connection can be controlled using a pressure of the gaseous medium prevailing in the first medium chamber.

Provision is advantageously made for the separating and displacing means to displace the medium in the second medium chamber in a pulse-type manner on account of pulse-type filling of the first medium chamber with the gaseous medium, in particular with compressed air. A pulse intensity of the medium in the second medium chamber can be set in a particularly advantageous manner via the pressure in the gaseous medium since this pressure is decisive for the speed of the displacement of the separating and displacing medium in the pressure cylinder and thus for the pulse intensity which can be generated.

Compressed air, in particular, can be handled in a simple manner from the point of view of open-loop and closed-loop control, thus resulting in a simple possibility of setting the pulse intensity for both medium flows. In a first variant, provision can be made for the switching valve to be designed as a solenoid valve and for the solenoid valve to have a first valve cross section. In a second variant, provision can be made for the switching valve to be designed as a double check valve, wherein the double check valve has a second valve cross section. In particular, a first and/or second valve cross section can be predetermined in such a way that a pulse intensity for bringing about pulse-type emptying of the first and/or second medium chamber can be defined by means of said valve cross section/s.

In a first variant, provision is advantageously made for the separating and displacing means to be designed, in particular, as a piston. In a second variant, provision is furthermore made for the separating and displacing means to be designed, in particular, as a diaphragm. In a third variant, provision is made for the separating and displacing means to be designed as a folded bellows. In concrete terms, this can mean that there is advantageously a large amount of design latitude in the technical configuration of the separating and displacing means. It is thus possible to adapt the separating and displacing means to the respective requirements of the specific purpose and location of use of the cleaning device. By an expedient choice of the separating and displacing means, for example, it is likewise possible to control the volume flow of the gaseous and liquid medium. In the embodiment as a piston, a higher volume flow is made possible than in the embodiment as a diaphragm since the piston has greater displaceability within the pressure cylinder. By way of example, an increased volume flow of the medium in the second medium chamber can thus be generated by way of a volume reduction of said chamber, that is to say by complete displacement of the medium from the second medium chamber.

In addition, provision is preferably made for the return means to be a compression spring and/or tension spring, the restoring force of the compression spring and/or tension spring being dimensioned in such a way that the separating and displacing means adopts an initial position, provided that the pressure transmitter surface is not subjected to pressure. Advantageously, designing the return means as a compression and/or tension spring provides a simple and thus low-cost way of resetting the selected separating and displacing means to an initial position after the gaseous medium has been discharged from the first medium chamber in order in this way to start a new application cycle. Via the design configuration of the compression and/or tension spring and thus via the resulting restoring force, it is furthermore possible in an advantageous manner to define the initial position of the separating and displacing means and thus to set the vacuum generated in the second medium chamber in the case of a return of the separating and displacing means. This, in turn, has an effect on the volume flow of the medium which is thus sucked in, which refills the second medium chamber before the subsequent application cycle is triggered. Furthermore, the configuration of the compression and/or tension spring has an influence on the achievable speed of the pulse sequence of the individual applications of the gaseous and the liquid medium.

A suitable choice of the pressure ratio with respect to the environment likewise proves to have an influence on the achievable speed of the pulse sequence of the individual applications of the gaseous and the liquid medium. Furthermore, this pressure difference determines the achievable cleaning force—to this extent the maximum pulse force of the pulse of a medium pulse on the surface—with which individual dirt particles can be detached. Speed adjustment is thus advantageously allowed.

As a further development, in a first variant, the switching valve is designed, in particular, as a solenoid valve and that the latter has a first predetermined valve cross section. In a second variant, the switching valve is alternatively designed as a double check valve, wherein the double check valve has a second predetermined valve cross section. It has proven advantageous for the second predetermined valve cross section to be larger than the first valve cross section of the solenoid valve. In particular, the double check valve can also be designed as a quick-action vent valve. This means that the switching valve can advantageously either be designed as a solenoid valve, this type of valve being easy to manage, particularly from the point of view of open-loop and closed-loop control, or can be designed as a double check valve or quick-action vent valve with a larger valve cross section, this configuration likewise permitting the generation of the compressed air pulse. It is thus advantageously possible, in the specific technical configuration of the cleaning device, to adapt the switching valve in accordance with the operating conditions to be expected.

In particular, the liquid medium can be mixed with an additive, in particular a liquid such as, for example, a cleaning and/or antifreeze liquid. The cleaning effect of the second medium, in particular water, is thereby increased in an advantageous manner. It is conceivable, for example, that contaminants containing oil may wet the surface to be treated. In this situation, water alone would have a significantly lower cleaning effect than a mixture of water and a cleaning agent, in particular a grease- and oil-dissolving cleaning agent. Moreover, adding an antifreeze to the liquid medium prevents the cleaning device from freezing at low temperatures. Thus, the cleaning device remains usable even in winter. Advantageously, the liquid medium can also be heatable. In addition or as an alternative, it is also possible for individual components of the cleaning device, such as medium lines, hoses or the like, to be heatable.

In a preferred development, provision is furthermore made for the cleaning device to supply a gaseous medium or a liquid medium or a gaseous medium and a liquid medium to the surface. In concrete terms, this can mean that the cleaning system is likewise capable, in particular, of supplying only the gaseous medium to the surface. Liquid medium is preferably to be discharged from the cleaning device only in conjunction with the gaseous medium, that is to say for water and air cleaning. Particularly in the case of severe contamination of the surface to be treated, it is advantageous, for example, first to carry out a plurality of cleaning cycles with the liquid medium—in particular with water or a mixture of water and a cleaning agent—before a number of cleaning cycles is carried out only with the gaseous medium, in particular compressed air. Thus, it is possible in a simple manner to remove even significant dirt from the surface. As an alternative, however, supply with compressed air only can be used to dry the surface.

In a preferred development, provision is furthermore made for the cleaning device also to have a second switching valve, which has a second pressure cylinder connection, a second medium source connection and a third medium source connection, for selecting a first switching state and a second switching state. In the first switching state of the second switching valve, the second medium chamber of the pressure cylinder can be connected via the medium connection to the second medium source connection and, in the second switching state of the second switching valve, it can be connected in turn to the third medium source connection. In concrete terms, this can mean that a further switching valve is connected upstream of the medium connection of the pressure cylinder in order to control filling of the second medium chamber with a medium from the second or third medium source. Here, the first and second medium sources provide a gaseous or liquid medium. However, a multiphase mixture, in particular steam, is also conceivable here. This results in the advantage that filling of the second medium chamber with a gaseous, a liquid or a multiphase mixture can be achieved in a simple manner. The outlay, particularly in terms of equipment, remains low.

In a preferred development of the compressed air system, provision is made for a first check valve to be arranged in the first nozzle feed line and/or for a second check valve to be arranged in the second medium feed line.

A first and/or second check valve advantageously provide/s a threshold pressure above which a medium pulse is emitted to the nozzle or a medium, in particular a medium pulse, is emitted to the pressure cylinder. Moreover, the first and/or second check valve prevent/s an unwanted intake of ambient air via the first nozzle and the return flow of the second medium from the second medium chamber into the second medium source.

In a preferred development of the compressed air system, provision is made, in a first variant, for the at least one nozzle to be designed with a common outlet opening for the gaseous and liquid medium.

In a second variant, provision is made for the at least one nozzle to be designed with separate outlet openings for the gaseous medium and the liquid medium.

In a third variant, provision is made for the compressed air system to have two nozzles, namely a first and second nozzle. Advantageously, a first nozzle can be connected via the first nozzle feed line to the first nozzle connection and a second nozzle can be connected via the second nozzle feed line to the second nozzle connection of the at least one cleaning device. Advantageously, the gaseous medium can be delivered in the first nozzle and the liquid medium can be delivered in the second nozzle.

In concrete terms, this can mean that the design configuration of the specific nozzle configuration can advantageously be adapted flexibly to the respective purpose. For example, a variant having one nozzle and one outlet opening reduces the outlay in terms of equipment and thus reduces weight and costs. A variant with separate outlet openings for the gaseous medium and the liquid medium offers the advantage that the outlet angle of the media relative to one another and to the surface to be acted upon can be chosen in a particularly advantageous way. In particular, it is possible in this way to make the gaseous medium act at a different angle than the liquid medium. It is thereby possible, for example, advantageously to increase the efficiency of the cleaning process and to adapt it to the respective purpose.

In particular, the first medium source is a compressed air source, in particular a compressor, and the second medium source is a fluid tank, in particular a water tank. In concrete terms, this can mean that the compressed air system in such a development can advantageously be integrated into a vehicle or similar mobile system since a vehicle generally already has a compressor and a water tank. In this way, necessary design changes to the vehicle or similar mobile system are advantageously minimized.

As a further development, the first medium source will serve another primary purpose, in particular that of supplying an air spring system or similar pneumatic system. In such a development, an already existing medium source, in particular a compressed air source, can advantageously be used to supply the cleaning device. This is advantageous particularly in the case of use in a vehicle or similar mobile system since the number of components required is reduced and thus weight, costs and energy can be saved.

The second medium source will serve another primary purpose, in particular that of supplying a window cleaning system or similar cleaning system. In such a development, an already existing medium source, in particular a liquid and/or cleaning agent source, can advantageously be used to supply the cleaning device. This is advantageous particularly in the case of use in a vehicle or similar mobile system since the number of components required is reduced and thus weight, costs and energy can be saved.

In a preferred development of the compressed air system, provision is made for the sensor to be an optical sensor, in particular an environment detection sensor, for example a LIDAR sensor, a radar sensor, a camera or the like. In such a development, a cleaning device is particularly advantageous since the regular cleaning of the sensor surface improves the functioning of the sensor, particularly since the optical properties of the sensor depend on the transparency and/or translucency of the sensor surface.

As a further development, in addition to the second medium source, the compressed air system a third medium source can be connected via the second medium feed line to the medium connection of the at least one cleaning device, wherein the third medium source is the ambient air. In concrete terms, this can mean that the second medium chamber can be filled with a gaseous medium, that is to say with the ambient air. This results, in particular, in the advantage that the third medium does not have to be stored in a tank or similar container. The outlay in terms of equipment is thus advantageously reduced.

With regard to the cleaning method for cleaning the surface, in the first switching state of the switching valve, pulse-type charging of the first medium chamber of the pressure cylinder with the gaseous medium, in particular compressed air, takes place, pulse-type displacement of the gaseous medium, in particular compressed air, or of the liquid medium, in particular water, from the second medium chamber of the pressure cylinder takes place; and the gaseous medium, in particular compressed air, or the liquid medium, in particular water, is supplied to the surface in a pulse-type manner from the second medium chamber of the pressure cylinder.

With regard to the cleaning method, in the second switching state of the switching valve, pulse-type discharge of the gaseous medium, in particular compressed air, from the first medium chamber of the pressure cylinder takes place; and the gaseous medium, in particular compressed air, is supplied to the surface in a pulse-type manner from the first medium chamber of the pressure cylinder. Here, too, the advantages are obtained in a manner similar to the advantages of the cleaning device.

Within the scope of an advantageous development of the cleaning method, the following steps are also provided: returning the pressure transmitter surface of the separating and displacing means, in particular the piston or the like, to the initial position by means of the restoring force; and automatic filling of the second medium chamber of the pressure cylinder with the gaseous medium, in particular compressed air, or the liquid medium, in particular water, by generating a vacuum in the second medium chamber of the pressure cylinder by means of the return of the pressure transmitter surface of the separating and displacing means to the initial position.

In a development of the cleaning method and of the cleaning device or of the compressed air system, a surface is supplied with a medium pulse, with a medium pulse, and the medium pulse is part of a sequence of medium pulses, in particular wherein a composition and/or succession of the sequence of medium pulses can be controlled, preferably in terms of time, selectively and/or intermittently. The development is based on the insight that a surface to be cleaned can be supplied with a medium pulse, in particular a succession of at least two selectively controlled gaseous and/or liquid media which are each guided onto the surface in a jet. This may, but need not, take place in the form of one or more pulses, that is to say in a pulse-type manner, and leads to a high cleaning effect. Here, the term "selectively controlled" means an alternate succession of supply with a fluid pulse, such as a water pulse, followed by supply with one or more compressed air pulses.

In particular, the cleaning method that the pressure cylinder can be designed to sequentially hold either the gaseous medium in the first medium chamber or the liquid medium and the gaseous medium in the second medium chamber. This means in concrete terms that the pressure cylinder functions as a type of alternating reservoir, wherein, after the discharge of the medium from the first medium chamber, the second medium chamber stores the medium to be discharged next and vice versa. This results in the advantage that additional medium reservoirs or the like are redundant. Consequently, the outlay in terms of equipment is advantageously reduced.

In respect of the vehicle, it is advantageous that a pneumatic system for supplying the first medium source with the gaseous medium is connected to the compressed air system, and a window cleaning system for supplying the second medium source with the liquid medium is connected to the compressed air system. In the case of the vehicle, this results, in particular, in the advantage that additional fluid tanks for the compressed air and the water are largely superfluous. This advantageously reduces the outlay in terms of equipment and thus the susceptibility of the system to faults and consequently likewise the costs.

Embodiments are now described below with reference to the drawings. These are not necessarily intended to represent the embodiments to scale; on the contrary, the drawing is executed in schematic and/or slightly distorted form, where useful for explanation. With regard to additions to the teachings directly recognizable from the drawing, attention is drawn to the relevant prior art. It should be borne in mind here that many modifications and changes relating to the form and detail of an embodiment can be made without departing from the general concept of the embodiments. The features disclosed in the description, in the drawing and in the claims may be provided, within the scope of the disclosure, both individually and in any desired combination. Moreover, all combinations of at least two of the features disclosed in the description, in the drawing and/or in the claims fall within the scope of the disclosure. The disclosure is not limited to the exact form or detail of the preferred embodiments shown and described below, nor is it limited to subject matter which would be restricted in comparison with the subject matter claimed in the claims. In the case of specified dimensioning ranges, the intention is also to disclose values lying within the limits mentioned as limit values and to allow for them to be used and claimed in any way. For the sake of simplicity, the same reference signs are used below for identical or similar parts or parts with identical or similar functions.

FIG. 1 shows the schematic view of one embodiment of the cleaning device 100 for supplying a medium pulse MP to a surface O, which has a switching valve 110 in the present form. The switching valve 110, in turn, has a pressure cylinder connection 111, a first medium source connection 112 and a second nozzle connection 113 and is designed to produce a connection between these connections.

In a first switching state S1, shown as a dashed line in FIG. 1, a connection between the first medium source connection 112 and the pressure cylinder connection 111 can be established via the switching valve 110. In a second switching state S2, shown as a continuous line in FIG. 1, a connection between the pressure cylinder connection 111 and the second nozzle connection 113 can in turn be established via the switching valve 110. The second nozzle connection 113 can then furthermore be connected to a number of nozzles D2, wherein the number is indicated symbolically in FIG. 1 by the second nozzle D2.

The switching valve 110 is furthermore connected via the pressure cylinder connection 111 to a pressure connection 121 of a pressure cylinder 120. This pressure cylinder 120 furthermore has a medium connection 122 and a first nozzle connection 123. The first nozzle connection 123 can likewise furthermore be connected to a number of nozzles D1, wherein the number is indicated symbolically in FIG. 1 by the first nozzle D1.

In the present case, the cleaning device 100 shown schematically in FIG. 1 furthermore has a first and second pressure transmitter surface 124.1, 124.2 of a separating and displacing means 125, which divides the pressure cylinder 120 into a first medium chamber 130 and a second medium chamber 140. In this case, the pressure connection 121 is assigned to the first medium chamber 130, and the medium connection 122 and the first nozzle connection 123 are assigned to the second medium chamber 140.

In the context of this embodiment, the separating and displacing means 125 thus has a first and/or second pressure transmitter surface 124.1, 124.2 in the first medium chamber 130 and the second medium chamber 140 of the pressure cylinder 120, wherein the first and/or second pressure transmitter surface 124.1, 124.2 can be subjected to different pressures in alternation, in particular to produce a pressure difference in order to produce the medium pulse. In particular, by virtue of an excess pressure in one of the chambers—here in the first medium chamber 130—a small compressed air accumulator is then achieved which empties itself or the other chamber simply on account of the excess pressure (e.g. 3-5 bar) prevailing in one chamber and thus supplies the surface O—in this case from the second medium chamber 140. In the reverse direction, in particular by virtue of an excess pressure in one of the chambers—then in the second medium chamber 140—a small compressed air accumulator can be achieved which empties simply on account of the excess pressure prevailing there (e.g. 3-5 bar) and thus supplies the surface O from the first medium chamber 130.

The pulse force of the compressed air pulse (e.g. from the second or first medium chamber 140, 130) results, in particular, from the expansion or pressure equalization via one of the nozzles D1, D2.

Although pulse-type supply to the surface can advantageously take place additionally or first on the basis of a restoring force $F_R$ of the separating or displacing means 125 of the pressure cylinder 120 as such or of a return means 126, in the present scenario this is in addition to the effect which results from the fact that the first and/or second pressure transmitter surface 124.1, 124.2 can be subjected to different pressures.

The pulse force of the medium from the first medium chamber 130 then results primarily from the application of pressure to the displacing means 125. Secondarily, this can also result correspondingly on the basis of a restoring force $F_R$ of a return means 126 if this has been configured accordingly by virtue of the design. The first medium thus already has a pressure equalization potential with respect to the ambient pressure owing to the pressure difference at the first and second pressure transmitter surfaces 124.1, 124.2, irrespective of further forces in the pressure cylinder 120. In addition, the $F_R$ of a return means 126 can then also act in the course of the pressure equalization, in particular to produce a pressure difference in order to produce the medium pulse.

In addition, in the embodiment of FIG. 1, a return means 126 is thus shown which is arranged in the second medium chamber 140 in the present case and generates a restoring force $F_R$; in another embodiment, however, it is also possible for a water pressure to provide for the restoring force. In the present case, this restoring force $F_R$ acts in turn on the second pressure transmitter surface 124.2, which is shown in FIG. 1 in an initial position $A_0$.

In the first switching state S1 of the switching valve 110, the first medium chamber 130 can therefore be connected or is connected via the pressure connection 121 to the first medium source connection 112 in order to reduce the volume V of the second medium chamber 140, and, in the second switching state S2 of the switching valve 110, the first medium chamber 130 can be connected or is connected via the pressure connection 121 to the second nozzle connection 113 in order to increase the volume V of the second medium chamber 140.

This is performed in such a way that the surface O can be supplied with a medium pulse MP of a liquid medium M2, and/or a medium pulse MP of a liquid medium M1 and, in this embodiment, it is implemented specifically as follows. The surface O is supplied with a medium pulse MP of the liquid medium M2, namely in the first switching state S1 with a first medium pulse MP1, preferably in the form of a water pulse or similar liquid pulse, and/or a medium pulse MP of the gaseous medium M1, namely in the second switching state with a second medium pulse MP2, preferably in the form of a compressed air pulse.

If the switching valve 110 is therefore in the first switching state S1, a first medium source MQ1, in particular a compressed air source, which is only indicated in FIG. 1, supplies the first medium source connection 112 of the switching valve 110 with a gaseous medium M1, in particular with compressed air. This gaseous medium M1 is then passed via the pressure cylinder connection 111 of the switching valve 110 to the pressure connection 121 of the pressure cylinder 120 and subsequently expands in a pulse-type manner in the first medium chamber 130.

As a result, the first and second pressure transmitter surfaces 124.1, 124.2 are displaced in the direction of the first nozzle connection 123 of the pressure cylinder 120, with the return means being compressed. As a result, there is a pulse-type reduction in the volume of the second medium chamber 140 by means of the second pressure transmitter surface 124.2. The gaseous medium M1 or liquid medium M2 located in the second medium chamber 140 thus acts in a pulse-type manner on the first nozzle connection 123 and is conveyed via the latter to a first nozzle D1, which is only indicated here. The latter then supplies a first medium pulse MP of gaseous medium M1 or liquid medium M2 to the surface O.

If the switching valve 110 is subsequently switched into the second switching state S2, the switching valve in this case establishing a connection between the pressure cylinder connection 111 and the second nozzle connection 113, a flow path to a second nozzle D2, likewise only indicated here, is opened to the pressurized gaseous medium M1. In comparison with the first switching state S1 of the switching valve 110, there is thus a reversal of the direction of flow. In addition, the gaseous medium M1 in the first medium chamber 130 is acted upon by a restoring force $F_R$ via the return means 126 and the second pressure transmitter surface 124.2. As a result, the gaseous medium M1 flows via the second nozzle connection 113 of the switching valve 110 in a pulse-like manner to an indicated second nozzle. The latter then supplies a second medium pulse MP of gaseous medium M1 to the surface O. In addition, by way of the restoring force $F_R$ of the return means 126, the pressure transmitter surface 124 returns once more to an initial position $A_0$. As a result, a vacuum is produced in the second medium chamber 140, by means of which vacuum induction of a gaseous medium M1 or a liquid medium M2 can be brought about at the medium connection 122, and thus refilling of the second medium chamber 140 of the pressure cylinder 120 can be effected.

The outlined process of supplying a medium pulse MP of the gaseous medium M1 or of the liquid medium M2 to a surface O via the second medium chamber 140 in the first switching state 51 of the switching valve 110, and of subsequently supplying a medium pulse MP of the gaseous medium M1 to a surface O via the first medium chamber 130 in the second switching state S2 of the switching valve 110, can be expanded, by suitable control of the switching valve 110, to form a sequence of medium pulses $MP_n$. The surface O is thus supplied with a medium pulse MP, and the medium pulse MP is part of a sequence of medium pulses MPG, which are illustrated in detail X in FIG. 1. In particular, a composition and/or succession of the sequence of medium pulses $MP_n$ can be controlled, preferably in terms of time, selectively and/or intermittently.

Figure 2A:
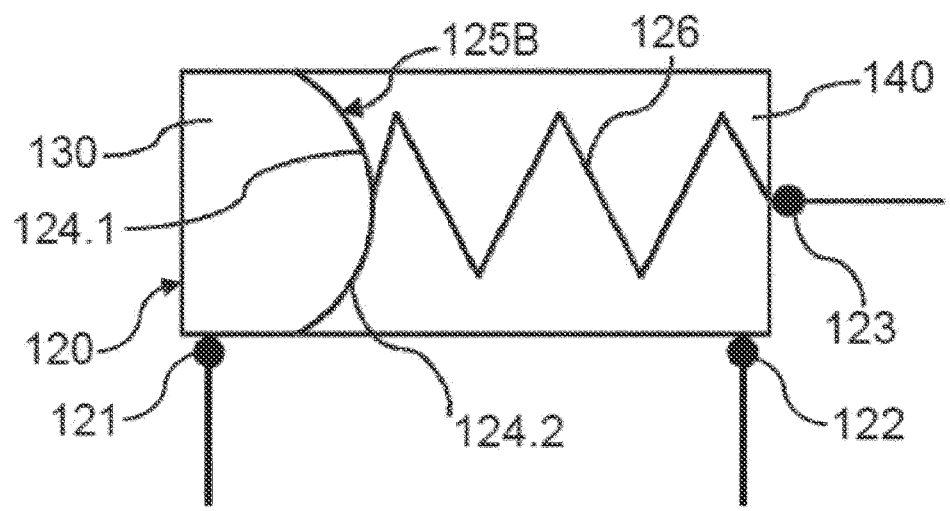
FIG. 2A shows the schematic view of a further preferred embodiment of a pressure cylinder.

FIG. 2A shows the schematic view of a further preferred embodiment, in particular of the pressure cylinder 120 of the cleaning device 100. In the present case, the embodiment shown schematically in FIG. 2A again has a pressure connection 121, a medium connection 122 and a first nozzle connection 123, and furthermore a first and second pressure transmitter surface 124.1, 124.2, which divides the pressure cylinder into a first medium chamber 130 and a second medium chamber 140, and a return means 126. Furthermore, the embodiment shown has a separating and displacing means, in the present case in the form of a diaphragm 125B. The diaphragm 125B can be acted upon by pressure on the side of the first medium chamber 130; in any case, however, it can be acted upon by different pressures on the side of the first and second medium chambers 130, 140. On the side of the second medium chamber 140, the diaphragm 125B can additionally be subjected to a restoring force $F_R$ by means of the return means 126. The momentum of the pressurized gaseous medium M1 expanding in the first medium chamber 130 can be transferred in a pulse-type manner via the diaphragm 125B to the gaseous medium M1 or the liquid medium M2 in the second medium chamber 140. During this process, the diaphragm 125B bulges in the direction of the second medium chamber 140 and consequently reduces its volume. Thus, the gaseous medium M1 or the liquid medium M2 in the second medium chamber 140 acts in a pulse-type manner on the first nozzle connection 123, the gaseous medium M1 or the liquid medium M2 being fed via the first nozzle connection 123 to a nozzle, not shown here, for supplying a medium pulse MP of the gaseous medium M1 or of the liquid medium M2 in the second medium chamber 140 to a surface O. The return means 126 then returns the diaphragm 125B, as a result of which a vacuum is produced in the second medium chamber 140, by means of which vacuum induction of a gaseous medium M1 or a liquid medium M2 can be brought about at the medium connection 122, and thus refilling of the second medium chamber 140 of the pressure cylinder 120 can be effected.

Figure 2B:
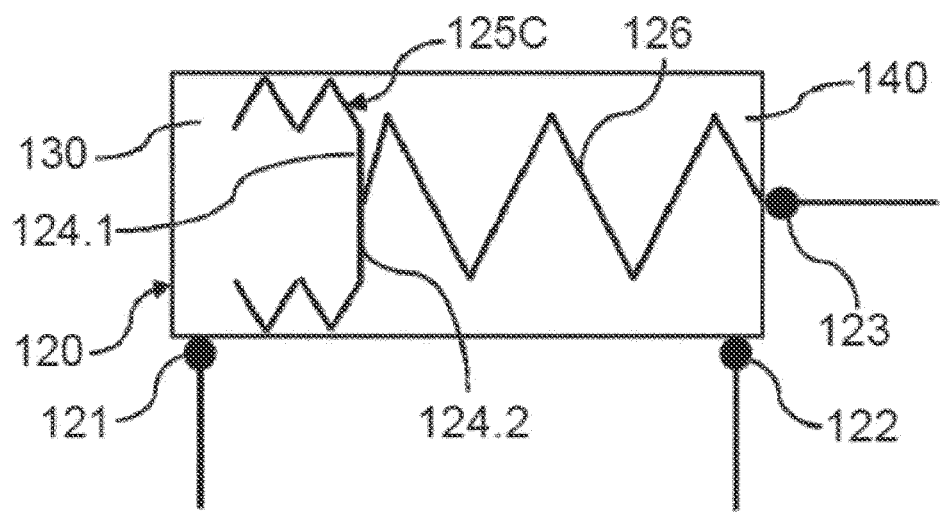
FIG. 2B shows the schematic view of a further preferred embodiment of a pressure cylinder.

FIG. 2B furthermore shows the schematic view of a further preferred embodiment, in particular of the pressure cylinder 120 of the cleaning device 100. In the embodiment shown, the separating and displacing means is in the present case in the form of a folded bellows 125C. The illustration of the technical function for the embodiment shown in FIG. 2A with a diaphragm 125B applies analogously to the folded bellows 125C.

In these embodiments in FIG. 2A and FIG. 2B too, therefore, in the first switching state S1 of the switching valve 110, the first medium chamber 130 can therefore be connected or is connected via the pressure connection 121 to the first medium source connection 112 in order to reduce the volume V of the second medium chamber 140, and, in the second switching state S2 of the switching valve 110, the first medium chamber 130 can be connected or is connected via the pressure connection 121 to the second nozzle connection 113 in order to increase the volume V of the second medium chamber 140.

Figure 3A:
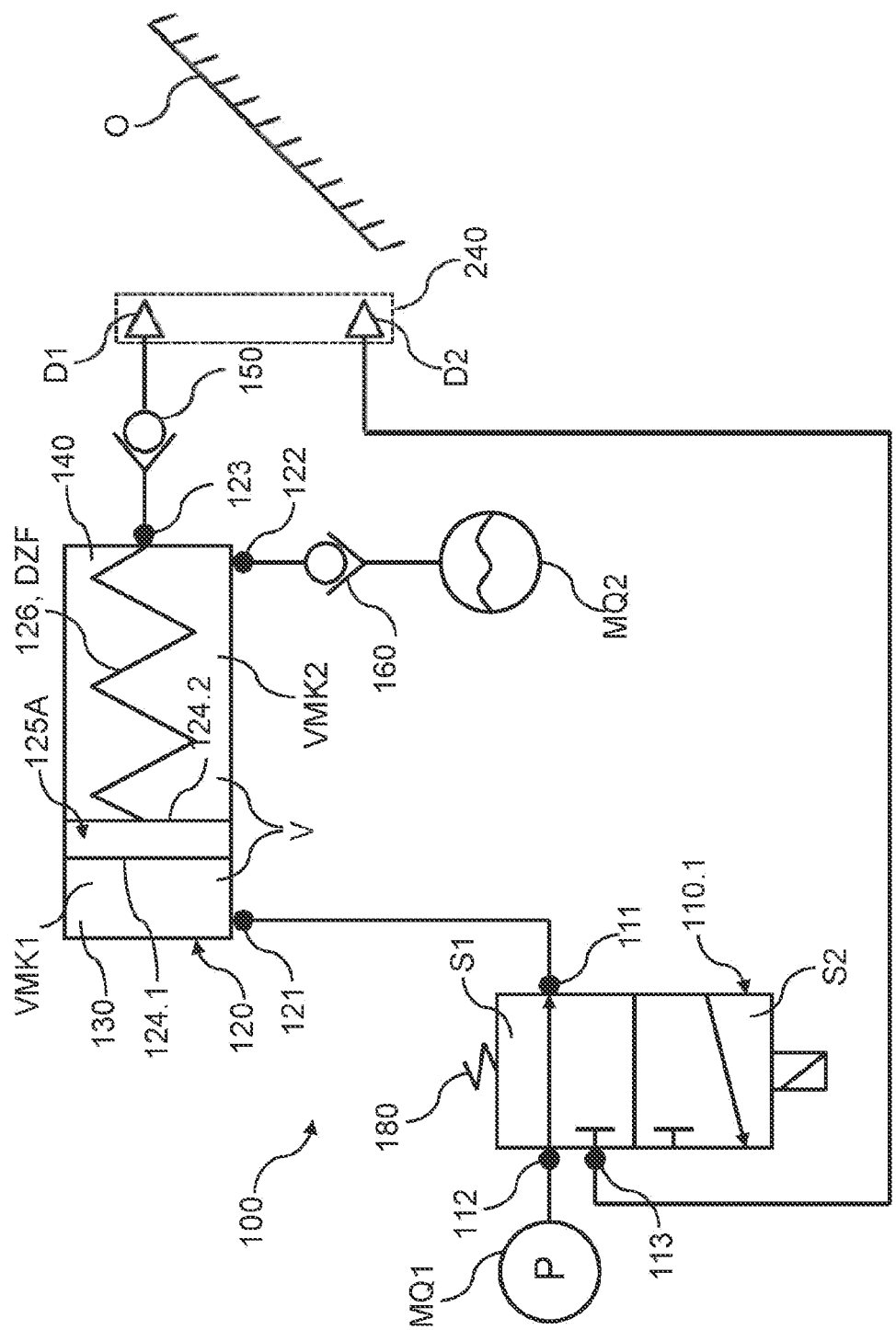
FIG. 3A shows the schematic view of a further preferred embodiment of a cleaning device, in particular with a solenoid valve.

FIG. 3A shows the schematic view of a preferred embodiment of the cleaning device 100 for supplying a medium pulse MP to a surface O, the switching valve 110 from FIG. 1 being designed in the present form as a controllable 3/2-way solenoid valve 110.1. Furthermore, FIG. 3A shows a first check valve 150 and a second check valve 160. Moreover, in the present case, the separating and displacing means 125 is designed as a piston 125A and the return means 126 is designed as a compression and/or tension spring DZF. Since, in the present case, the return means 126 is arranged in the second medium chamber 140, the compression and/or tension spring DZF is in this case designed specifically as a compression spring. All other reference signs in FIG. 3A have a meaning analogous to that in FIG. 1.

In this case, the first check valve 150 is assigned to the first nozzle connection 123 of the second medium chamber 140, the second check valve 160 in turn being assigned to the medium connection 122 of the second medium chamber 140 of the pressure cylinder 120.

In this case, the first check valve 150 is designed, in the second switching state S2 of the solenoid valve 110.1, to prevent induction of a medium, in particular air, via the first nozzle connection 123 of the second medium chamber 140 of the pressure cylinder 120. Thus, the second medium chamber 140 sucks in exclusively a gaseous medium M1 or a liquid medium M2 via the medium connection 122 in order to refill the second medium chamber 140 with a gaseous medium M1 or a liquid medium M2.

In turn, the second check valve 160 is designed, in the first switching state S1 of the solenoid valve 110.1, to prevent escape of the gaseous medium M1 held in the second medium chamber 140 or of the liquid medium M2 via the medium connection 122. Thus, the gaseous medium M1 or the liquid medium M2 in the second medium chamber 140 acts exclusively on the first nozzle connection 123 in order to be delivered via the latter to a nozzle for supplying a medium pulse MP of the gaseous medium M1 or of the liquid medium M2 in the second medium chamber 140 to a surface O.

Figure 3B:
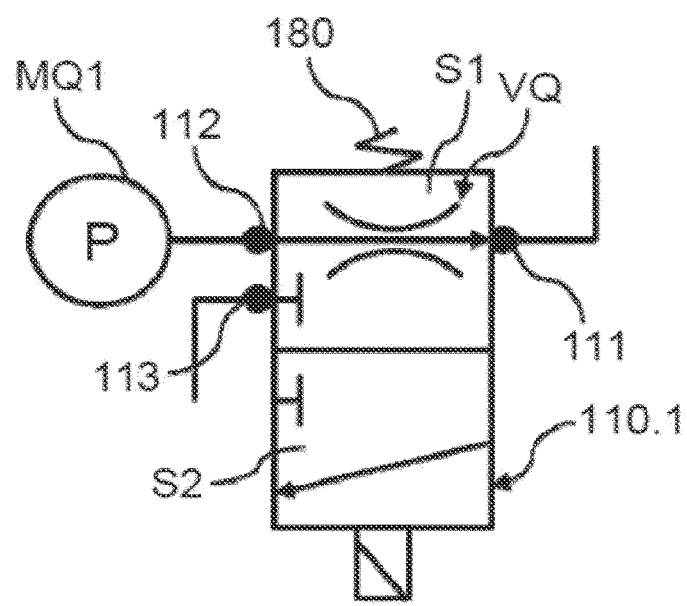
FIG. 3B shows schematically a first switching state of a solenoid valve of a preferred embodiment of a cleaning device.
Figure 3C:
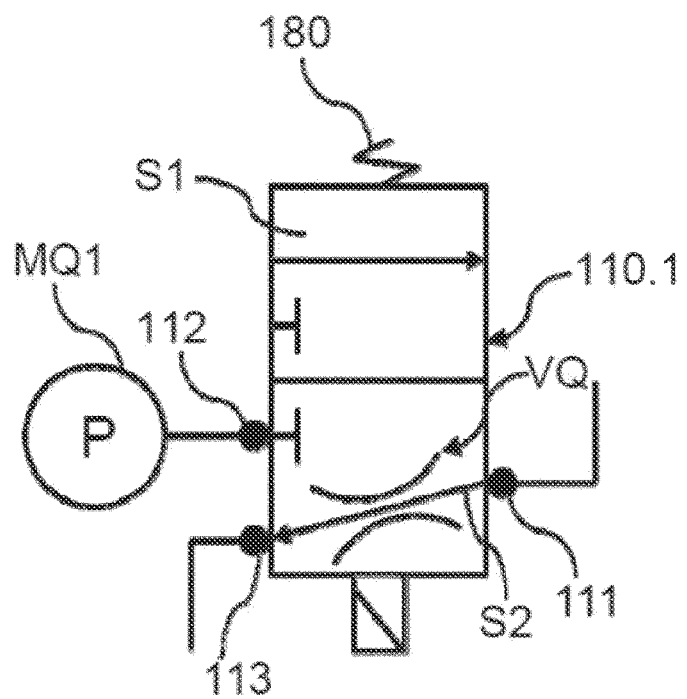
FIG. 3C shows schematically a second switching state of a solenoid valve of a preferred embodiment of a cleaning device.

FIG. 3B and FIG. 3C schematically show the first switching state S1 and the second switching state S2 of the 3/2-way solenoid valve 110.1 as a preferred embodiment of the switching valve 110, wherein the solenoid valve 110.1 has a pressure cylinder connection 111, a first medium source connection 112 and a second nozzle connection 113.

FIG. 3B shows the energized switching state, that is to say the first switching state S1 of the solenoid valve 110.1. In this case, an electromagnet produces a counterforce to the spring force produced by the spring 180 in order to connect the first medium connection 112 through to the pressure cylinder connection 111. This means that the gaseous medium M1 can flow from the first medium connection 112 via the pressure cylinder connection 111 to the first medium chamber 130 of the pressure cylinder 120.

FIG. 3C, in contrast, shows the deenergized switching state, that is to say the second switching state S2 of the solenoid valve 110.1. Owing to the interruption of the current flow to the electromagnet of the solenoid valve, it no longer produces a counterforce to the spring force produced by the spring 180. Thus, the solenoid valve 110.1 switches the second nozzle connection 113 through to the pressure cylinder connection 111. That is, the pressurized gaseous medium M1 escapes from the first medium chamber 130 via the second nozzle connection 113 of the solenoid valve 110.1.

As shown in FIG. 3, the switching valve 110 can be designed as a solenoid valve 110.1, and the solenoid valve 110.1 can have a valve cross section VQ1, which is illustrated schematically in FIG. 3B and FIG. 3C.

Figure 4:
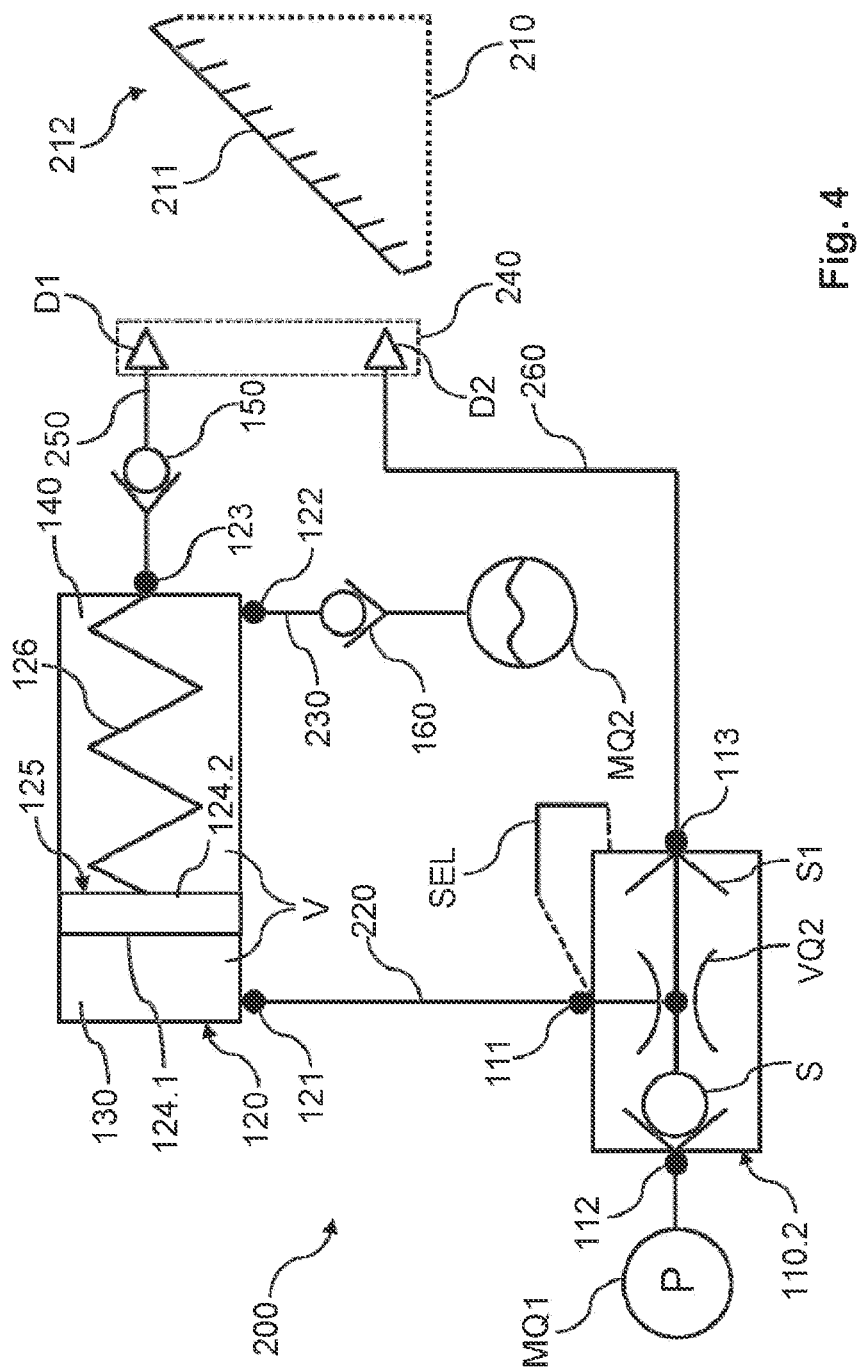
FIG. 4 shows a schematic illustration of a compressed air system, in particular with a double check valve.

In a variant as shown in FIG. 4, the switching valve 110 can also be designed as a double check valve 110.2, wherein the double check valve 110.2 has a second valve cross section VQ2.

The first and second valve cross section VQ1, VQ2 are predetermined in such a way that a pulse intensity for bringing about pulse-type emptying of the first and second medium chamber 130, 140 can be defined by means of said valve cross sections. In this regard, FIG. 4 shows specifically a schematic illustration of one embodiment of a compressed air system 200. In addition to the components of the cleaning device 100 which are described above, the present compressed air system 200 also has a first medium source MQ1, in particular a compressed air source, and a second medium source MQ2, in particular a water source. In the present case, the switching valve 110 from FIG. 1 is designed as a double check valve 110.2, as an alternative variant embodiment to the solenoid valve 110.1 described above, wherein the double check valve 110.2 is designed to be functionally identical to the solenoid valve 110.1 in the context of the present embodiment. In addition, FIG. 4 schematically shows a number of nozzles 240, and the surface O here forms the transparent cover 211 of a sensor 210, in particular of an environment detection sensor 212.

FIG. 4 also shows that the pressure cylinder connection 111 of the double check valve 110.2 is connected via a first medium feed line 220 to the pressure connection 121 of the pressure cylinder 120 or of the first medium chamber 130. In addition, it is shown that the second medium source MQ2 is connected via a second medium feed line 230 to the medium connection 122 of the pressure cylinder 120 or of the second medium chamber 140, wherein the second check valve 160 is furthermore arranged in the second medium feed line 230. Furthermore, FIG. 4 shows that the first nozzle connection 123 of the pressure cylinder 120 or of the second medium chamber 140 is connected to a number of nozzles 240 via a first nozzle feed line 250, wherein the first check valve 150 is furthermore arranged in the first nozzle feed line 250. It is also shown that the second nozzle connection 113 of the double check valve 110.2 is connected to the number of nozzles 240 via a second nozzle feed line 260.

Figure 5:
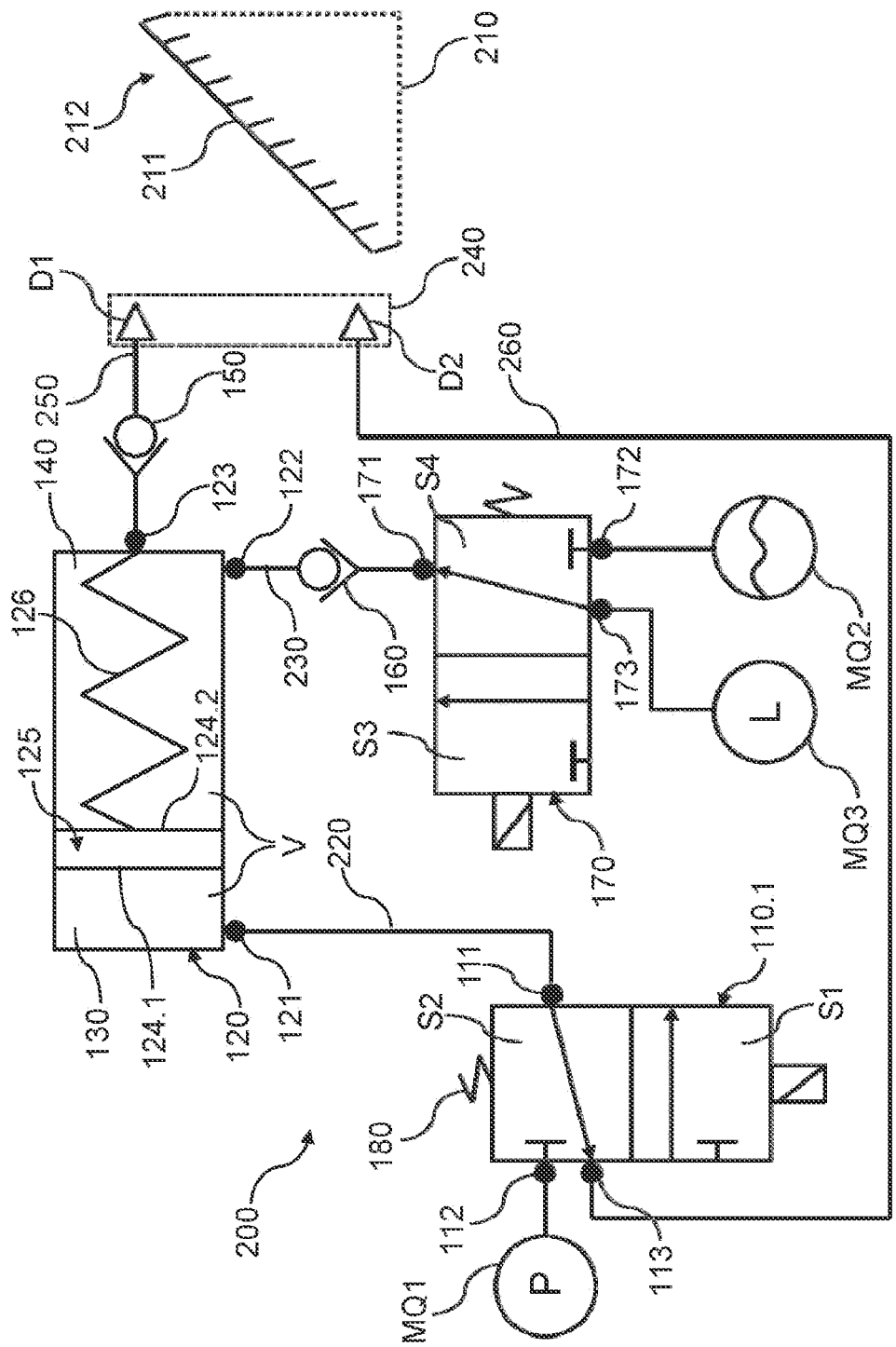
FIG. 5 shows a schematic illustration of a compressed air system with a second switching valve, in particular a second solenoid valve.

FIG. 5 shows a schematic illustration of another preferred embodiment of a compressed air system 200. In the present case, in contrast to the preceding FIG. 4, the switching valve 110 from FIG. 1 is again shown to be designed as a 3/2-way solenoid valve 110.1.

In addition, the present embodiment of a compressed air system 200 has a second switching valve 170. In FIG. 5, this is again shown as a 3/2-way solenoid valve. The second switching valve 170 also has a second pressure cylinder connection 171, a second medium source connection 172, to which a second medium source MQ2 can be connected, and a third medium source connection 173, to which a third medium source MQ3, in particular the ambient air, can be connected. The second pressure cylinder connection 171 is in turn connected via the second medium feed line 230 to the medium connection 122 of the second medium chamber 140 of the pressure cylinder 120.

In a first switching state S3 of the second switching valve 170, the second medium source connection 172 is switched through to the second pressure cylinder connection 171. The second medium source MQ2 also provides the liquid medium M2, in particular water, at the second medium source connection 172. Consequently, in the first switching state S3 of the second switching valve 170, the second medium chamber 140 of the pressure cylinder 120 sucks in, in particular, the liquid medium M2 via the medium connection 122.

In the second switching state S4, visible in FIG. 5, of the second switching valve 170, the second medium source connection 173 is in turn switched through to the second pressure cylinder connection 171. The third medium source MQ3 furthermore provides the gaseous medium M1, in particular ambient air, at the third medium source connection 173. Consequently, in the second switching state S4 of the second switching valve 170, the second medium chamber 140 of the pressure cylinder 120 sucks in, in particular, the gaseous medium M1 from the third medium source MQ3, i.e. ambient air, via the medium connection 122. Overall, in the embodiment in FIG. 5 that the second medium chamber 140 can be connected via the medium connection 122 to the second medium source connection 172 in the first switching state S3 of the second switching valve 170, and to the third medium source connection 173 in the second switching state S4 of the second switching valve 170.

As a result, the second switching valve 170 controls the filling of the second medium chamber 140 of the pressure cylinder 120 with either a gaseous medium M1 or with a liquid medium M2. Alternatively, however, a source for a multiphase mixture, for example steam, would also be conceivable as the third medium source MQ3.

Figure 6:
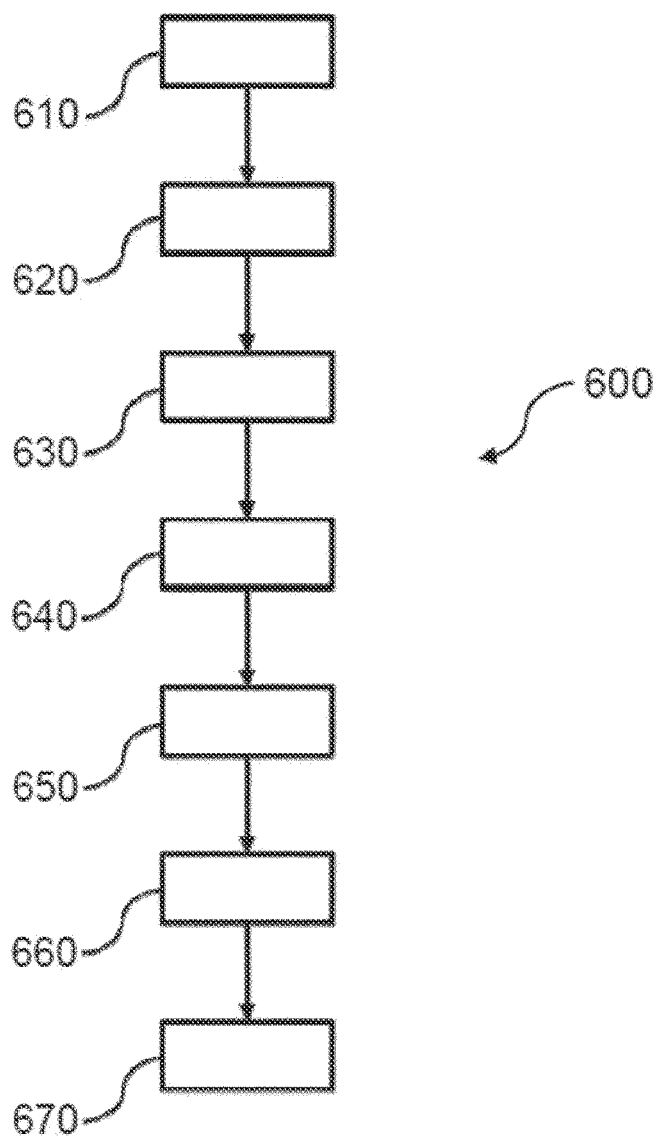
FIG. 6 shows a sequence of a preferred cleaning process in one embodiment.

FIG. 6 shows a schematic illustration of a sequence of a cleaning process 600. Here, the cleaning process for supplying a medium pulse MP to a surface O passes through the following steps. In the first switching state S1 of the switching valve 110, pulse-type charging 610 of the first medium chamber 130 of the pressure cylinder 120 with the gaseous medium M1, in particular with compressed air, first of all takes place. This produces pulse-type displacement 620 of the gaseous medium M1, in particular compressed air, or of the liquid medium M2, in particular water, from the second medium chamber 140 of the pressure cylinder 120. This is followed by pulse-type supply 630 of the gaseous medium M1, in particular compressed air, or the liquid medium M2, in particular water, to the surface O from the second medium chamber 140 of the pressure cylinder 120. In the second switching state S2 of the switching valve 110, pulse-type discharge 640 of the gaseous medium M1, in particular compressed air, from the first medium chamber 130 of the pressure cylinder 120 then takes place. This results in pulse-type supply 650 of the gaseous medium M1, in particular compressed air, to the surface O from the first medium chamber 130 of the pressure cylinder 120. This is followed by the return 660 of the pressure transmitter surface 124 of the separating and displacing means 125, in particular the piston 125A or the like, to the initial position $A_0$, preferably by means of the restoring force $F_R$. Finally, there follows automatic filling 670 of the second medium chamber 140 of the pressure cylinder 120 with the gaseous medium M1, in particular compressed air, or the liquid medium M2, in particular water. This is accomplished by generating a vacuum in the second medium chamber 140 of the pressure cylinder 120 by means of the return of the second pressure transmitter surface 124.2 of the separating and displacing means 125 to the initial position $A_0$.

Figure 7:
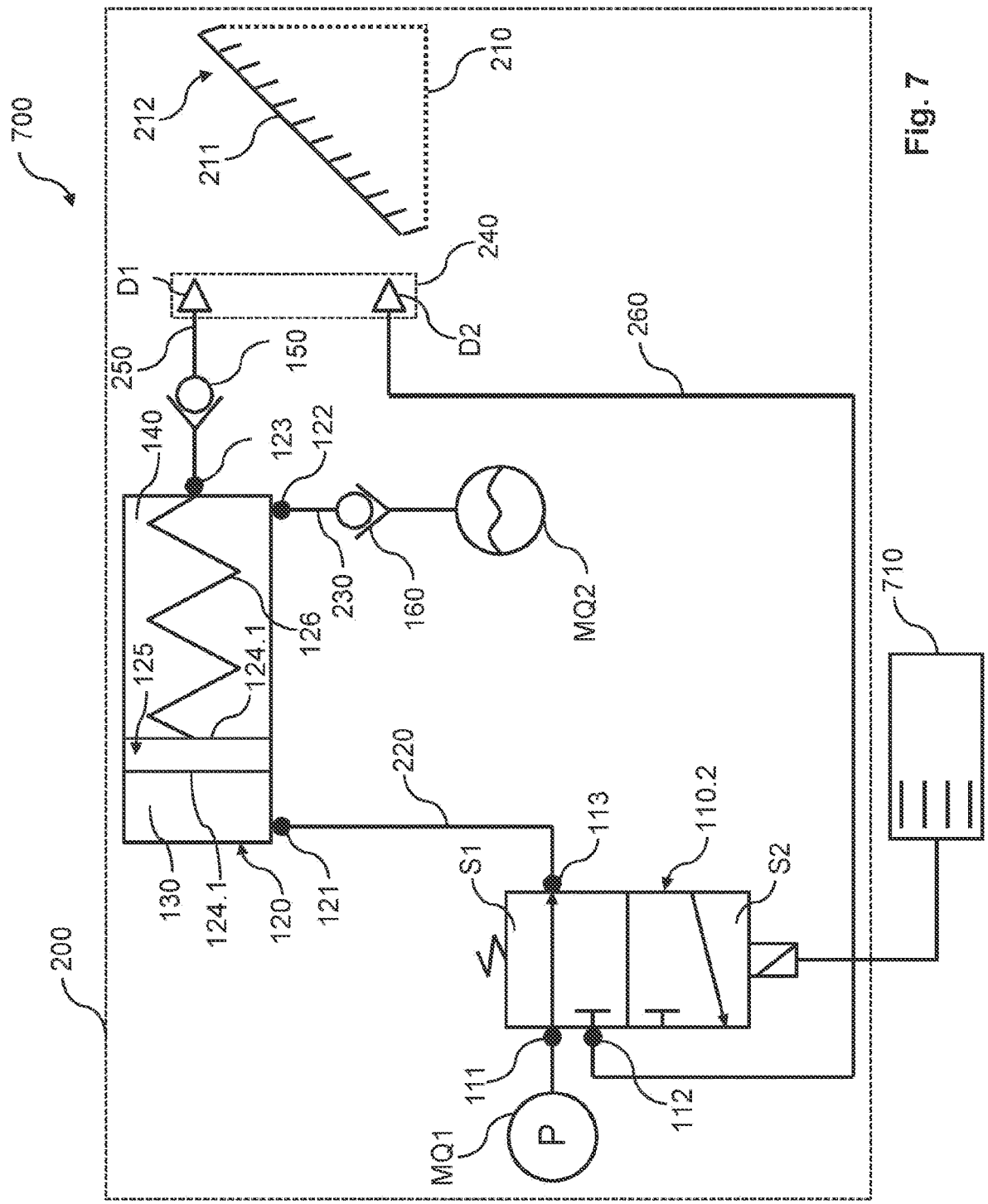
FIG. 7 shows a schematic illustration of a control system in one embodiment.

FIG. 7 shows a schematic illustration of a control system 700, wherein the control system 700 carries out the steps of the cleaning process 600 for a compressed air system 200 by means of the open-loop and/or closed-loop control device 710 in order to supply a medium pulse MP to a surface O. This involves, in particular, switching over switching valve 110, which has a first pressure cylinder connection 111, a first medium source connection 112 and a second nozzle connection 113 and is designed for switching into a first switching state S1 and a second switching state S2. This also involves switching over switching valve 170, which has a second pressure cylinder connection 171, a second medium source connection 172 and a third medium source connection 173 for selecting a first switching state S3 and a second switching state S4.

Figure 8:
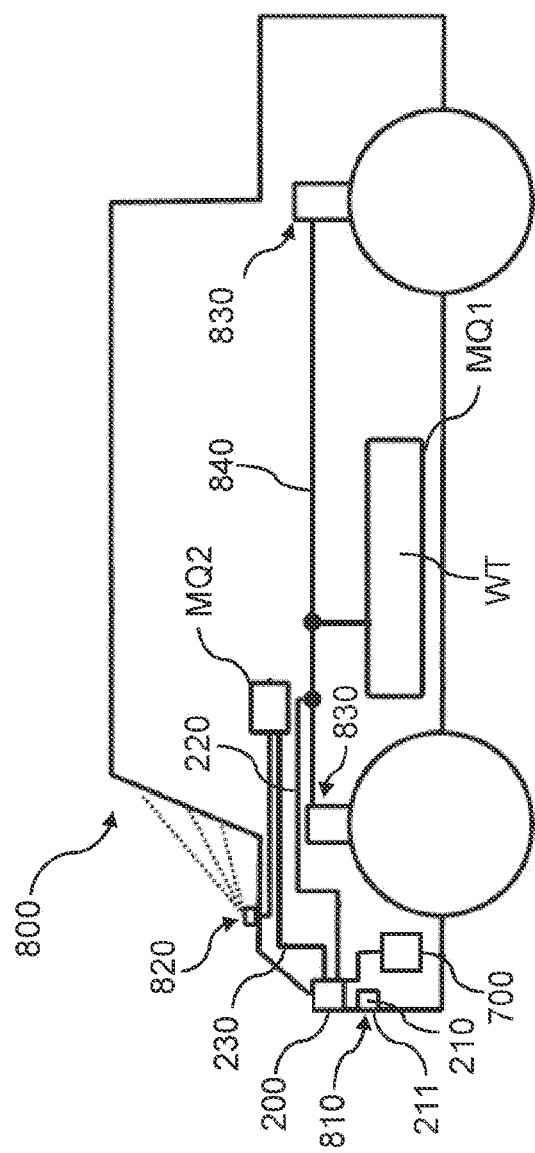
FIG. 8 shows a schematic illustration of a vehicle having a sensor system in one embodiment.

FIG. 8 shows a schematic illustration of a vehicle 800—in the present case in the form of a passenger car—having a compressed air system 200 with an environment detection sensor 210 of a sensor system 810, wherein the environment detection sensor 210 has a transparent cover 211, and further having a control system 700. In the present case, the first medium source MQ1 is formed by a compressed air supply system 840, which is furthermore provided for supplying a pneumatic system 830 in the form of an air spring system. Of course, it is also possible for the first medium source MQ1 to be formed by a separate compressor or similar compressed air source. For the purpose of feeding the gaseous medium M1, the first medium source MQ1 is connected to the compressed air system 200 via a first medium feed line 220. In the present case, the second medium source MQ2 has a water tank WT, which is likewise used to supply a cleaning system in the form of a window cleaning system 820 with cleaning liquid, in particular water. This tank is connected via a second medium feed line 230 to the compressed air system 200. In this way, the liquid medium M2 can be supplied to the compressed air system 200 via a pump (not shown here for reasons of clarity). Of course, it is also possible in the case of the second medium source MQ2 for this to be formed by a separate medium source of its own, which is, in particular, independent of other systems.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 cleaning device
110 switching valve
110.1 solenoid valve
110.2 double check valve
111 pressure cylinder connection
112 first medium source connection
113 second nozzle connection
120 pressure cylinder
121 switching valve connection
122 medium connection
123 first nozzle connection
124.1, 124.2 first, second pressure transmitter surface
125 separating and displacing means
125A piston
125B diaphragm
125C folded bellows
126 return means
130 first medium chamber
140 second medium chamber
150 first check valve
160 second check valve
170 second switching valve
171 second pressure cylinder connection
172 second medium source connection
173 third medium source connection
180 spring
200 compressed air system
210 sensor
211 transparent cover
212 environment detection sensor
220 first medium feed line 230 second medium feed line
240 nozzle
250 first nozzle feed line
260 second nozzle feed line
600 cleaning method
610, 620, 630, method steps
640, 650, 660,
670
700 control system
710 open-loop and/or closed-loop control device
800 vehicle
810 sensor system
820 window cleaning system
830 pneumatic system
840 compressed air supply system
$A_0$ initial position
$D_1$ first nozzle
$D_2$ second nozzle
DZF compression or tension spring
$F_R$ restoring force
K compressor
M1 gaseous medium
M2 liquid medium
MP medium pulse
$MP_n$ sequence of medium pulses
MQ1 first medium source
MQ2 second medium source
MQ3 third medium source
O surface
S1 first switching state
S2 second switching state
SEL quick-action vent line
UL ambient air
V volume of pressure cylinder
VMK1 volume of first medium chamber
VMK2 volume of second medium chamber
VQ valve cross section
VS volume flow
WT water tank

The invention claimed is:

1. A cleaning device for supplying a medium pulse to a surface, the cleaning device comprising:
   a pressure cylinder having a pressure connection, a medium connection, and a first nozzle connection connected to a first nozzle,
   a separator and displacer, having a first and/or second pressure transmitter surface, arranged in the pressure cylinder in order to divide a volume of the pressure cylinder into a first medium chamber and a second medium chamber and configured to change a volume of the first and second medium chambers,
   a switching valve having a first pressure cylinder connection, a first medium source connection, and a second nozzle connection connected to a second nozzle, the switching valve being configured to switch into a first switching state and a second switching state, the switching valve being arranged between a compressed gas source connected to the first medium source connection and the pressure cylinder and between second nozzle and the pressure cylinder such that the pressure connection is connected to the first pressure cylinder connection in both the first switching state and the second switching state,
   wherein, in the first switching state, the first medium chamber is configured to be connected, via the pressure connection, to the first medium source connection in order to reduce the volume of the second medium chamber such that the surface is supplied with a liquid pulse via the first nozzle,
   wherein in the second switching state, the first medium chamber is connected, via the pressure connection, to the second nozzle connection in order to increase the volume of the second medium chamber such that the surface is supplied with a gas pulse via the second nozzle.

2. The cleaning device as claimed in claim 1, wherein the separator and displacer has the first pressure transmitter surface in the first medium chamber and the second pressure transmitter surface in the second medium chamber of the pressure cylinder, wherein the first and second pressure transmitter surfaces are configured to be subjected to different pressures in order to produce the liquid and gas pulses.

3. The cleaning device as claimed in claim 2, wherein the separator and displacer has a return in the first medium chamber and/or the second medium chamber of the pressure cylinder, wherein the return can be subjected to different pressures on a side of the first and/or second medium chamber, wherein the separator and displacer can be subjected to a restoring force via the return additionally in order to produce the gas pulse.

4. The cleaning device as claimed in claim 3, wherein pulse-type emptying of the second medium chamber to the first nozzle connection is configured to be brought about via the first medium chamber, and
   pulse-type emptying of the first medium chamber to the second nozzle connection is configured to be brought about via the restoring force wherein the surface is configured to be subjected to a liquid medium in the first switching state with the liquid pulse and gas in the second switching state with the gas pulse.

5. The cleaning device as claimed in claim 1, wherein, when the first medium chamber is emptied in a pulse-type manner, the second medium chamber of the pressure cylinder is configured to be filled with a liquid medium and a gaseous medium via the medium connection.

6. The cleaning device as claimed in claim 1, wherein a volume flow of gas and liquid generated by the pressure cylinder can be defined via the volume of the pressure cylinder, and wherein the separator and displacer is configured to bring about pulse-type emptying of the second medium chamber to the first nozzle connection.

7. The cleaning device as claimed in claim 6, wherein a pulse intensity of the pulse-type emptying of the second medium chamber via the first nozzle connection can be controlled using a pressure of the gas prevailing in the first medium chamber.

8. The cleaning device as claimed in claim 1, wherein the separator and displacer is designed as a piston, a diaphragm or a folded bellows.

9. The cleaning device as claimed in claim 1, wherein the switching valve is designed as a solenoid valve having a first valve cross section, or the switching valve is designed as a double check valve having a second valve cross section,
   wherein the first or second valve cross sections is predetermined such that a pulse intensity for bringing about pulse-type emptying of the first or second medium chamber can be defined via the first or second valve cross section.

10. The cleaning device as claimed in claim 1, wherein the liquid for the liquid pulse is configured to be mixed with an additive and components of the cleaning device are configured to be heated.

11. The cleaning device as claimed in claim 1, further comprising:
a second switching valve having a second pressure cylinder connection, a second medium source connection and a third medium source connection for selecting a first switching state and a second switching state,
wherein the second medium chamber is configured to be connected via the medium connection to the second medium source connection in the first switching state of the second switching valve, and to the third medium source connection in the second switching state of the second switching valve.

12. A compressed air system, comprising:
at least one cleaning device as claimed in claim 1; and
at least one sensor of a sensor system, the sensor having a surface;
the compressed gas source being a first medium source and the first medium source being connected, via a first medium feed line, to the first medium source connection of the at least one cleaning device,
a second medium source connected, via a second medium feed line, to the medium connection of the at least one cleaning device, and
a collection of nozzles including the first and second nozzles, the collection of nozzles being connected, via a first nozzle feed line, to the first nozzle connection and, via a second nozzle feed line, to the second nozzle connection of the at least one cleaning device.

13. The compressed air system as claimed in claim 12, wherein a first check valve is arranged in the first nozzle feed line or a second check valve is arranged in the second medium feed line.

14. The compressed air system as claimed in claim 12, wherein the collection of nozzles includes an outlet opening for a gaseous and a liquid medium or the collection of nozzles includes separate outlet openings for the gaseous medium and the liquid medium.

15. The compressed air system as claimed in claim 12,
wherein the first nozzle is configured to be connected via the first nozzle feed line to the first nozzle connection and the second nozzle is configured to be connected via the second nozzle feed line to the second nozzle connection of the at least one cleaning device.

16. The compressed air system as claimed in claim 12, wherein the second medium source is a fluid tank,
wherein the first medium source is configured to supply an air spring system or pneumatic system, or
wherein the second medium source is configured to supply a window cleaning system.

17. The compressed air system as claimed in claim 12, wherein a third medium source is configured to be connected to the medium connection of the at least one cleaning device via the second medium feed line, wherein the third medium source is the ambient air.

18. A cleaning method for supplying a medium pulse to a surface, the method comprising:
providing a cleaning device comprising:
a pressure cylinder having a pressure connection, a medium connection, and a first nozzle connection connected to a first nozzle,
a separator and displacer, having a first or second pressure transmitter surface, arranged in the pressure cylinder in order to divide a volume of the pressure cylinder into a first medium chamber and a second medium chamber and configured to change a volume of the first and second medium chambers, and
a switching valve having a first pressure cylinder connection, a first medium source connection, and a second nozzle connection connected to a second nozzle, the switching valve being configured to switch into a first switching state and a second switching state, the switching valve being arranged between a compressed gas source connected to the first medium source connection and the pressure cylinder and between the second nozzle and the pressure cylinder such that the pressure connection is connected to the first pressure cylinder connection in both the first switching state and the second switching state,
wherein, in the first switching state, the first medium chamber is configured to be connected, via the pressure connection, to the first medium source connection in order to reduce the volume of the second medium chamber such that the surface is supplied with a liquid pulse via the first nozzle, and
wherein in the second switching state, the first medium chamber is connected, via the pressure connection, to the second nozzle connection in order to increase the volume of the second medium chamber such that the surface is supplied with a gas pulse via the second nozzle;
switching the switching valve between the first switching state and the second switching state.

19. The cleaning method as claimed in claim 18, wherein in the first switching state of the switching valve, pulse-type charging of the first medium chamber of the pressure cylinder with a gaseous medium takes place, pulse-type displacement of a liquid medium from the second medium chamber of the pressure cylinder takes place, and the liquid medium is supplied to the surface in a pulse-type manner from the second medium chamber of the pressure cylinder, or
in the second switching state of the switching valve, pulse-type discharge of the gaseous medium from the first medium chamber of the pressure cylinder takes place, and the gaseous medium is supplied to the surface in a pulse-type manner from the first medium chamber of the pressure cylinder.

20. The cleaning method as claimed in claim 18, further comprising:
returning the first or second pressure transmitter surface to an initial position via a restoring force; and
automatically filling the second medium chamber of the pressure cylinder with a liquid medium by generating a vacuum in the second medium chamber of the pressure cylinder via return of the first or second pressure transmitter surface to the initial position.

21. The cleaning method as claimed in claim 18, wherein the surface is supplied with the medium pulse, and the medium pulse is part of a sequence of medium pulses controlled in terms of time, selectively or intermittently.

22. The cleaning method as claimed in claim 18, wherein the pressure cylinder is configured to hold a gaseous medium in the first medium chamber and a liquid medium and the gaseous medium in the second medium chamber.

23. A vehicle having the compressed air system as claimed in claim 12.

24. The vehicle as claimed in claim 23, wherein a pneumatic system for supplying the first medium source with a gaseous medium is connected to the compressed air system, and a window cleaning system for supplying the second medium source with a liquid medium is connected to the compressed air system.

\* \* \* \* \*